United States Patent [19]

San Miguel

[11] 4,084,512
[45] Apr. 18, 1978

[54] PRESSURE RELIEF CONSTRUCTION FOR CONTROLLED COMBUSTION OF ORDNANCE ITEMS

[75] Inventor: Anthony San Miguel, Ridgecrest, Calif.

[73] Assignee: The United States of America as represented by the Secretary of the Navy, Washington, D.C.

[21] Appl. No.: 733,484

[22] Filed: Oct. 18, 1976

[51] Int. Cl.² .......................................... F42B 13/12
[52] U.S. Cl. .................................. 102/103; 102/105
[58] Field of Search ...................... 102/103, 105, 37.8, 102/37.7; 169/57; 220/201, 207, 257, 261; 206/3

[56] References Cited

U.S. PATENT DOCUMENTS

| | | | |
|---|---|---|---|
| 2,535,624 | 12/1950 | Burney | 102/38 |
| 3,173,364 | 3/1965 | Nordzell | 102/1 R |
| 3,486,656 | 12/1969 | Foote | 220/261 |
| 3,800,878 | 4/1974 | Poitras | 169/57 |
| 3,802,346 | 4/1974 | Martin | 102/103 |
| 3,972,289 | 8/1976 | Morris | 169/57 |
| 3,992,997 | 11/1976 | McCubbin | 102/105 |
| 4,004,516 | 1/1977 | Johnson | 102/56 R |
| 4,022,130 | 5/1977 | Johnson | 102/56 R |

OTHER PUBLICATIONS

"Industrial Heating", Mar. 1960, pp. 593-613.

Primary Examiner—Samuel W. Engle
Assistant Examiner—Donald P. Walsh
Attorney, Agent, or Firm—R. S. Sciascia; Roy Miller; T. W. Hennen

[57] ABSTRACT

An ordnance item casing construction which enables case venting and controlled combustion of high energy fuel contained within the casing when the ordnance item is exposed to a high temperature environment. This casing construction utilizes a perforated thermally insulating composite doubler and series of thermally conductive plugs aligned with cavities in the casing wall, and applied to the exterior of the ordnance item. Heat from the high temperature environment is conducted by the plugs to the casing wall.

Local ignition and combustion of high energy fuel within the casing rapidly burns through the wall at regions of reduced wall thickness caused by presence of the cavities. The interior of the casing is thereby vented, and catastrophic pressure buildup within the casing is prevented.

10 Claims, 3 Drawing Figures

PRESSURE RELIEF CONSTRUCTION FOR CONTROLLED COMBUSTION OF ORDNANCE ITEMS

BACKGROUND OF THE INVENTION

1. Field of the Invention

This invention pertains to the construction of walls used to contain high energy fuels or the like. More particularly, this invention pertains to such structure which, when subjected to a high temperature environment, vents in a predetermined manner to relieve internal pressure and permit controlled combustion of the high energy fuel contained therein.

2. Description of the Prior Art

Structures which contain high energy fuels, such as rocket motor combustion chamber casings, or warhead casings, will explode when exposed to a fire or other high temperature environment because of uncontrolled ignition of the contained fuel and resultant catastrophic internal pessure buildup. One place where this problem is especially serious is on the flight deck of an aircraft carrier where a large quantity of explosive ordnance may be temporarily stored during flight operations. In such situations it is possible for an aircraft fuel tank to rupture and cause a fuel fire on the flight deck. This fire will engulf ordnance loaded on aircraft or stored nearby, and will eventually cause that ordnance to explode with devastating effect upon surrounding equipment and personnel.

Military test procedures and requirements for the heat resisting capability or ordnance items are described in Mil-Std-1648, a military specification of the United States Government which is unclassified and available to the public.

Past attempts to solve this problem have included placing a thermal barrier on the exterior of the rocket motor casing or warhead in an attempt to thermally insulate the rocket motor propellant or explosive material from the fire. This approach attempts to increase the length of time the ordnance item may be exposed to a fire without exploding by keeping the internal temperature low. If the fire is not extinguished within a short period of time, the internal temperature will increase and the ordnance item will ignite and explode. Such thermal insulation coatings are not efficient because they add nonfunctional weight to the rocket or warhead, and they increase the cost and field handling problems associated with that ordnance item. Also, aerodynamic drag of that ordnance item may be increased.

Pressurization liners have also been used with varying degrees of success. Such liners are designed to degrade into a gas at low temperature to supply controlled internal pressure for causing rupture of preweakened venting structure in the casing wall. The main problem encountered with a pressurization liner is that if the liner degrades and pressurizes too suddenly, the propellant grain may crack and when ignited, the grain will cause an uncontrolled pressure rise which will cause the casing to explode anyway.

Intumescent coatings have also been used with varying degrees of success. The main drawback to using an intumescent coating is that the coating is applied to the exterior of the item, and must be protected from scratches and abrasion. When exposed to a fire, the intumescent coating forms a very light insulating layer which may easily be swept away if, for example, a stream of water is directed upon it.

Some attempts to overcome the explosion hazard when explosive filled containers are subjected to fire or other high temperature environments have involved placing a thermally insulating liner between the inside of the pressurization liner and the high energy fuel. Once again, such an approach may increase the length of time before an explosion occurs, but it will not by itself ultimately prevent explosion if the explosive filled container is not removed from the fire or other high temperature environment. Also, with additional liners, the available volume for high energy fuel is reduced. Finally, existing ordnance may not be retrofitted with extra liners at low cost.

SUMMARY OF THE INVENTION

These problems have been overcome by the present invention. The casing structure of this invention utilizes a plurality of cavities formed into the outer surface of the casing wall. Next, a doubler having low thermal conductivity is bonded to the exterior surface of the casing over the pattern of cavities. A corresponding plurality of holes penetrate the doubler and are arranged to align with the cavities in the casing. A second material having high thermal conductivity is placed into the holes and matching cavities of the doubler and casing respectively, and forms plugs.

When this structure is exposed to a high temperature environment such as a fire, each plug conducts heat directly to the portions of the casing wall which have been made thin by the presence of a cavity in the outer surface. High energy fuel contained in the casing is heated at these points and eventually begins local combustion. The ignited fuel quickly burns through the thin portions of the casing wall and thereby vents internal pressure. This venting may take place substantially simultaneously at each of a number of points distributed over the surface of the casing.

BRIEF DESCRIPTION OF THE DRAWING

Further advantages of the present invention will emerge from a description which follows of a preferred embodiment of a rocket motor equipped with the invention, given with reference to the accompanying drawing figures, in which.

DESCRIPTION OF THE PREFERRED EMBODIMENT

Figure 1:
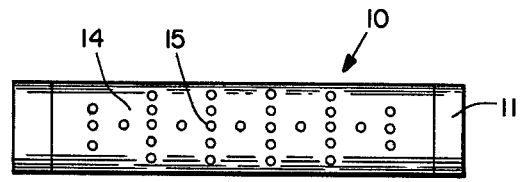
FIG. 1 is a ventral view of a rocket motor according to the invention.

Referring now to the drawing figures wherein like reference numerals correspond to like parts and elements throughout the several figures, there is shown in FIG. 1 rocket motor 10 comprising rocket motor casing 11, thermally insulating doubler 14, and thermally conductive plug 15. FIG. 1 shows a representative pattern of thermally conductive plugs 15 arranged over the ventral surface of rocket motor casing 11. Plugs 15 could be formed into slots or shapes other than cylinders as required by a given ordnance item design.

Figure 2:
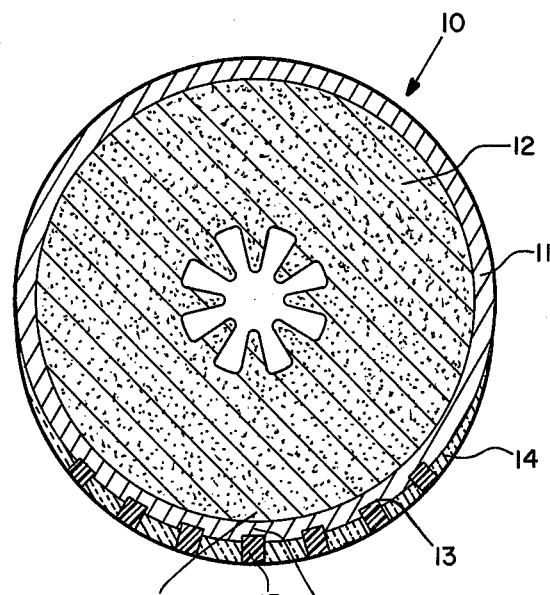
FIG. 2 is a cross sectional view of a rocket motor according to the invention.

FIG. 2 more clearly shows the structure of this invention. Rocket motor casing 11 is shown containing rocket motor propellant grain 12. Thermally insulating doubler 14 is shown bonded to the outer surface of rocket motor casing 11. Cavities 13 are shown formed in rocket motor casing 11, and may be formed therein by any conventional means. Cavities 13 may in particular be formed by conventional machining techniques, or by chemical machining or etching methods which are well known. Cavities 13 need not be circular, and could well be linear or curvilinear in configuration as required for a given ordnance item. Cavities 13 leave zones of reduced casing wall thickness at 17, which form casing vents as will be described below.

Thermally insulating doubler 14 may be manufactured from any high strength material having low thermal conductivity. One material which may be used for doubler 14 is a glass fiber and polymeric resin composite. Thermally conductive plug 15 could be made from any material which has high thermal conductivity. A graphite filled polymeric material may be used for plug 15.

Holes in doubler 14 are arranged to align with cavities 13 so that plug 15 is in direct contact with both the high temperature environment and the zones of reduced casing thickness at 17. Doubler 14 serves to help thermally insulate the outer surface of casing 11, and also provides added strength to make up for casing strength lost when cavities 13 are formed in casing 12. Doubler 14 will eventually burn away after a minimum exposure time sufficient to vent casing 11. Plug 15 is therefore able to concentrate heat reaching propellant grain 12 at predetermined zones 16.

Doubler 14 and plug 15 add minimum weight and only minimally affect the aerodynamic characteristics of the ordnance item to which they are installed. Ordnance items may be specially designed to incorporate the structure of this invention, or existing ordnance items may be modified by the addition of this external structure. Thus the safety of existing ordnance may be improved at minimal expense by utilizing this invention.

Figure 3:
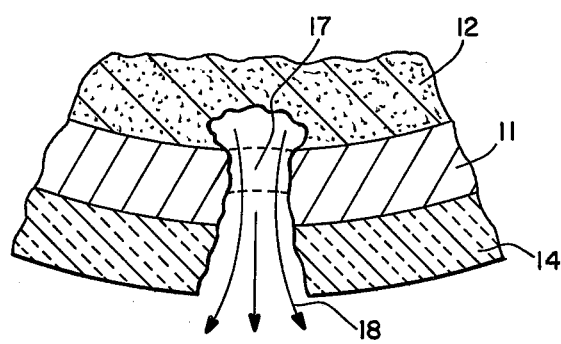
FIG. 3 is a fragmentary sectional view of a rocket motor casing.

FIG. 3 more clearly shows the mechanism of venting provided by this invention. As heat from a fire environment is conducted by way of plug 15 to zone 17, propellant grain 12 is ignited and begins local combustion at 16. Casing 11 is thermally conducted. Propellant grain 12 rapidly burns through reduced casing thickness zone 17 and vents combustion gas pressure 18 to the exterior of rocket motor casing 11. As burning of propellant grain 12 continues, the holes formed in casing 11 continue to widen. With internal gas pressure on rocket motor casing 11 relieved, propellant 12 burns harmlessly until fully consumed.

This technique for preventing explosion of high energy fuel containers may be applied to any sort of container, but is especially useful on warheads, rocket motors, and other items of ordnance which may be subjected to prolonged fire conditions.

When mounted under an aircraft wing, a rocket motor or other ordnance item is most vulnerable to a fuel fire on its lower portion. Therefore, the structure of this invention need not completely surround the item, but may be attached to the lower or ventral side only, and still provide adequate protection. Also, by venting down and away from the carrying aircraft, further damage to the aircraft may be avoided. Finally, this invention does not interfere with the function of conventional propellant liners because it is external to the ordnance item.

The invention has been described in an illustrative manner and it is to be understood that the terminology which has been used is intended to be in the nature of words of description rather than of limitation. Obviously many modifications and variations of the present invention are possible in the light of the above teachings. It is therefore to be understood that within the scope of the appended claims the invention may be practiced otherwise than as specifically described.

What is claimed is:

1. A casing structure for an ordnance item comprising:
   a wall having an inner and an outer surface, said inner surface at least partially defining a chamber for containing high energy fuel, said outer surface defining at least one cavity and corresponding zone of reduced wall thickness;
   a thermally insulating doubler rigidly attached to said outer surface and having at least one aperture aligned with each cavity; and
   a thermally conducting plug occupying said cavity and aligned aperture.

2. Casing structure as set forth in claim 1 wherein said thermally insulating doubler comprises a composite polymeric material which includes glass fibers.

3. Casing structure as set forth in claim 1 wherein said thermally conducting plug comprises a polymeric material having a graphite filler.

4. Casing structure as set forth in claim 1 wherein said chamber contains high energy fuel.

5. Casing structure as set forth in claim 4 wherein said high energy fuel contacts said inner surface at said zone of reduced wall thickness.

6. A casing structure for an ordnance item, comprising:
   a thermally conducting solid wall having continuous inner and outer surfaces, said inner surface at least partially defining a chamber for containing high energy fuel, said outer surface defining at least one cavity and corresponding zone of reduced wall thickness;
   a thermally insulating doubler rigidly attached to said outer surface and having an aperture aligned with each cavity respectively; and
   a thermally conducting plug occupying each cavity and aligned aperture, each plug being maintained in thermal contact with said outer surface at each respective corresponding zone of reduced wall thickness.

7. Casing structure as set forth in claim 6 wherein said outer surface defines a plurality of linear cavities and said doubler defines a corresponding plurality of slotted apertures aligned with said linear cavities.

8. Casing structure as set forth in claim 6 wherein said wall defines a hollow cylinder.

9. Casing structure as set forth in claim 6 wherein said doubler is attached to only a portion of said outer surface and said doubler has a varying thickness.

10. Casing structure as set forth in claim 6 wherein said doubler has an exterior surface and each thermally conducting plug has an exterior end configured to form a continuous surface with said exterior surface of said doubler so that aerodynamic characteristics of said ordnance item are only minimally affected.

* * * * *